United States Patent
Epstein

(10) Patent No.: US 7,398,395 B2
(45) Date of Patent: Jul. 8, 2008

(54) USING MULTIPLE WATERMARKS TO PROTECT CONTENT MATERIAL

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 999 days.

(21) Appl. No.: 09/957,129

(22) Filed: Sep. 20, 2001

(65) Prior Publication Data

US 2003/0056101 A1  Mar. 20, 2003

(51) Int. Cl.
*H04L 9/00* (2006.01)
*H04N 7/167* (2006.01)

(52) U.S. Cl. .................. 713/176; 713/177; 713/178; 713/179; 713/180; 380/201; 380/216; 380/232

(58) Field of Classification Search .......... 382/100, 382/232, 217; 380/200, 201, 217, 28, 232; 713/176–180, 200–202
See application file for complete search history.

(56) References Cited

U.S. PATENT DOCUMENTS

| | | | |
|---|---|---|---|
| 5,889,868 A | 3/1999 | Moskowitz et al. | 380/51 |
| 5,933,798 A | 8/1999 | Linnartz | 702/191 |
| 6,078,664 A | 6/2000 | Moskowitz et al. | |
| 6,122,392 A | 9/2000 | Rhoads | 382/100 |
| 6,208,735 B1 | 3/2001 | Cox | 380/54 |
| 6,209,092 B1 | 3/2001 | Linnartz | 713/176 |
| 6,252,972 B1 | 6/2001 | Linnartz | 382/100 |
| 6,278,385 B1 * | 8/2001 | Kondo et al. | 341/50 |
| 6,332,194 B1 * | 12/2001 | Bloom et al. | 713/176 |
| 6,798,893 B1 * | 9/2004 | Tanaka | 382/100 |
| 2001/0024510 A1 * | 9/2001 | Iwamura | 382/100 |

FOREIGN PATENT DOCUMENTS

EP    WO9936876    7/1999

* cited by examiner

*Primary Examiner*—Longbit Chai
(74) *Attorney, Agent, or Firm*—Larry Liberchuk

(57) ABSTRACT

Content material is protected with a variety of watermarking processes. Different subsets of the protected content material are submitted to different watermarking processes. At the rendering device, a watermark detector is configured to detect one or more different watermarks. Only if the particular watermark(s) that the rendering device is configured to detect is removed from the protected content material will the rendering device permit the rendering of the protected material. If the particular watermark(s) that the rendering device is configured to detect is unpredictable, or if the particular segment that is protected by a particular watermark is undetectable, a wholesale removal of specific watermarks from the watermarked material will neither be efficient nor economically viable.

20 Claims, 1 Drawing Sheet

USING MULTIPLE WATERMARKS TO PROTECT CONTENT MATERIAL

BACKGROUND OF THE INVENTION

1. Field of the Invention

This invention relates to the field of security, and in particular to the protection of content material via watermarking.

2. Description of Related Art

Watermarking is becoming an increasingly popular technique for protecting content material. A watermarking process embeds an indelible mark into the content material that is configured to be imperceptible during a conventional rendering of the content material. For example, an audio recording is embedded with a watermark by adding material to the audio recording in such a manner that the added material is spatially masked when processed via a conventional audio playback device.

The watermark that is applied to the content material is determined to be irremovable from the content material, so that a rendering device will always be able to detect watermarked material. In this manner, a rendering device can be configured to deny rendering to watermarked material, absent some evidence that the user is authorized to render the watermarked material. For example, U.S. Pat. No. 6,209,092, "METHOD AND SYSTEM FOR TRANSFERRING CONTENT INFORMATION AND SUPPLEMENTAL INFORMATION RELATED THERETO", issued 27 Mar. 2001 to Johan P. M. G. Linnartz et al, presents a technique for the protection of copyright material via the use of a "ticket" that controls the number of times the protected material may be rendered, and is incorporated by reference herein. If the rendering device detects the presence of a watermark, the ticket is checked to determine whether this rendering exceeds the limited number of authorized renderings. In an example embodiment, the ticket forms the watermark.

Watermarks are preferably designed to be irremovable from the watermarked material. In an effective watermarked object, the watermark cannot be removed without introducing substantial damage to the watermarked object. In the example of an audio recording that is protected by a watermark, attempts to remove the watermark will generally introduce audible distortion to the playback of the previously-watermarked material.

As watermarking becomes more prevalent, so too will attempts to remove watermarking with minimal damage to the protected material. With the ease of communication and distribution provided by the Internet, once a hacker determines how to overcome a particular watermark, it can be expected that the process for removing the watermark will become commonly available, thereby obviating the protection provided by the watermark. This problem will be particularly devastating if current attempts to "standardize" on one watermarking process are successful, and a process for removing this standard watermark is discovered.

BRIEF SUMMARY OF THE INVENTION

It is an object of this invention to protect watermarked content material in the event of a discovery of a process that removes a watermark without causing substantial damage to the watermarked material. It is a further object of this invention to provide a watermarking process that is robust despite the discovery of watermark-removing algorithms.

These objects and others are achieved by protecting content material with a variety of watermarking processes. Different subsets of the protected content material are submitted to different watermarking processes. At the rendering device, a watermark detector is configured to detect one or more different watermarks. Only if the particular watermark(s) that the rendering device is configured to detect is removed from the protected content material will the rendering device permit the rendering of the protected material. If the particular watermark(s) that the rendering device is configured to detect is unpredictable, or if the particular segment that is protected by a particular watermark is undetectable, a wholesale removal of specific watermarks from the watermarked material will neither be efficient nor economically viable.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
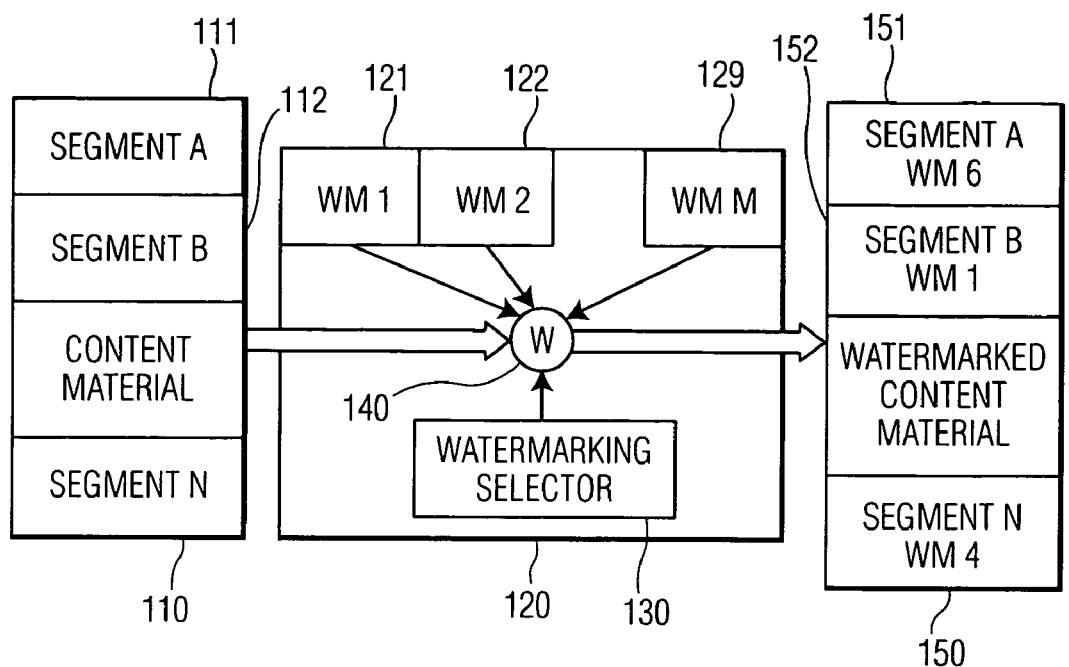
FIG. 1 illustrates an example block diagram of a watermark encoding system in accordance with this invention.

This invention is premised on the recognition that no watermarking system is truly invulnerable to attempts to remove it. With the potential revenues or other benefits available to providers of illicit providers of content material, one can reasonably expect that substantial resources are being applied to avoid copy-protection schemes, such as watermarking. For ease of reference, the term watermark removal is used hereinafter to indicate a process that prevents the watermark from being detected by a detector that is intended to detect the watermark. It can be expected that any watermark removal will introduce some damage to the content material. Generally, a successful watermark removal is characterized as being one that does not substantially damage the content material during the removal process.

This invention is further premised on the observation that a successful generic watermark removal process is not likely to be found, and that each successful watermark removal process will be targeted to a particular watermarking process. Such watermark-specific watermark removal processes will generally not remove watermarks produced by other watermarking processes, and/or will generally not avoid detection by alternative watermark detection processes.

U.S. Pat. No. 6,252,972 "METHOD AND ARRANGEMENT FOR DETECTING A WATERMARK USING STATISTICAL CHARACTERISTICS OF THE INFORMATION SIGNAL IN WHICH THE WATERMARK IS EMBEDDED", issued 26 Jun. 2001 to Johan P. M. G. Linnartz, and incorporated by reference herein, teaches an encoding process wherein a particular binary pattern of +1 and −1 is added to each element of the content material. At the detector, the same binary pattern is applied to the received input signal to determine whether a sufficient correlation exists to decide that the received input contains this pattern. U.S. Pat. No. 6,208,735 "SECURE SPREAD SPECTRUM WATERMARKING FOR MULTIMEDIA DATA", issued 27 Mar. 2001 to Ingemar J. Cox et al, and incorporated by reference herein teaches a watermarking technique wherein a spread spectrum encoding of the watermark is applied to the content material, wherein the spread spectrum information is particularly targeted to the significant frequency components of the content material. U.S. Pat. No. 6,078,664 "Z-TRANSFORM IMPLEMENTATION OF DIGITAL WATERMARKS", issued 20 Jun. 2000 to Scott A. Moskowitz et al, and incorporated by reference herein, teaches the use of a z-transform of the content material to determine the location of "non-deterministic" components of the content material. The watermark information is targeted for insertion at these non-deterministic components.

A common technique for watermark removal is the addition of noise that is particularly targeted to the watermark. For example, a random addition of +1 and −1 to each of the elements in the watermarked output of the '972 patent might adversely affect the correlation determination. Such a random addition, however, would not likely affect the detection of watermarks added at the particular frequency components of the '735 and '664 patents. Similarly, a watermark removal process that targets the significant frequency components of the content material, to remove a watermark produced by the '635 patent, is not likely to affect the correlation determination of the '972 patent, nor the detection of a watermark placed at different components, per the '664 patent.

Note that each of these proposed techniques for watermark removal adversely affects the content material, by adding noise or other cancellation information intended to remove a particular type of watermark. In the example of the '972 patent, the watermarking process adds some distortion to the content material, but at a level that is below perceptibility by a typical user. The added random noise that is intended to erase the watermark, however, may bring the distortion level to a level of perceptibility. It is assumed herein that the cumulative effect of applying multiple watermark removal processes to watermarked content material will produce sufficient distortion of the content material to negate the viability of a multi-targeted watermark removal process.

FIG. 1 illustrates an example block diagram of a watermark encoding system 120. In accordance with this invention, the watermark encoding system 120 includes a variety of different watermarking systems WM1 121, WM2 122, . . . WM M129. Each of these watermarking systems employs a different technique for applying a watermark to content material 110.

In addition to the above referenced patents, examples of different watermarking processes can be found in U.S. Pat. No. 5,933,798 "DETECTING A WATERMARK EMBEDDED IN AN INFORMATION SIGNAL", issued 3 Aug. 1999 to Johan P. M. G. Linnartz; U.S. Pat. No. 5,889,868 "OPTIMIZATION METHODS FOR THE INSERTION, PROTECTION, AND DETECTION OF DIGITAL WATERMARKS IN DIGITIZED DATA", issued 30 Mar. 1999 to Scott A. Moskowitz et al; and U.S. patent "SIGNAL PROCESSING TO HIDE PLURAL-BIT INFORMATION IN IMAGE, VIDEO, AND AUDIO DATA", issued 29 Sep. 2000 to Geoffrey B. Rhoads, and are each incorporated by reference herein. Other watermarking processes are known in the art.

In a preferred embodiment, a watermark selector 130 is configured to randomly select a particular watermark system 121-129 to apply to each segment 110, 111, etc. of the input content material 110. For the purposes of this invention, the term random is used to imply a process that provides a selection that is not easily predictable. The size of each segment may be constant or variable, and may correspond to a logical partitioning of the content material. For example, each segment may correspond to each song on an audio CD, or to each frame of a video DVD. Alternatively, the segment may be related to the physical structure of the media that is intended to contain the watermarked material 150, such as the track/sector structure of a CD or DVD. In like manner, the segment size may be dependent upon the particular watermarking system selected for encoding that segment. For example, frequency-component based watermarking systems will typically require a minimum sized segment of content material in order to effect the frequency analysis portion of the process. In like manner, the pattern-matching correlation detection systems require a minimum sized segment of watermarked material to effect a reliable correlation detection. In a preferred embodiment of this invention, the segment size is also randomly determined, subject to the aforementioned minimum size requirements, if any.

As each segment 111, 112, etc. of the content material 110 is watermarked by the selected watermarking process, it is added as a watermarked segment 151, 152, etc., to the output watermarked content material 150. As illustrated in FIG. 1, this watermarked material 150 comprises a plurality of segments 151, 152, etc., each of which may be watermarked in a different manner, WM6, WM1, etc., respectively.

Because the content material 150 includes a plurality of watermarks, an illicit watermark removal requires either multiple applications of specific watermark removal processes, or the targeted application of specific watermark removal processes to select segments of watermarked material. As noted above, the application of multiple watermark removal processes can be expected to render the resultant material unusable for its intended purpose, due to the cumulative distortions introduced by each removal process. The targeted application of specific watermark removal processes, on the other hand, requires knowledge of which watermark process was applied to each segment. In a preferred embodiment, as noted above, the selection of each watermark process to apply is random, and, to further frustrate a targeted removal, the size of each watermarked segment is also randomly determined. Thus, in accordance with the principles of this invention, the content material 150 provides a particularly robust solution to illicit watermark removal attempts.

Additionally, the content material 150 is sufficiently robust to allow for enforcement of copy protection, and other security schemes. A typical rendering device that conforms to a copy-protection scheme is configured to process the watermarked material to determine the presence of a watermark. Such a rendering device will preclude access to the content material as soon as the watermark is detected. Note that the typical watermark detection process requires a certain minimum amount of watermarked material to effect the watermark detection, but does not typically require that the entirety of the content material be verified as containing the watermark. That is, for example, if a CD player or recorder is configured to detect an example watermark process WM 1 (121 in FIG. 1), the CD player or recorder will detect WM 1 when Segment B 152 of the watermarked material 150 is processed, and will terminate the rendering/recording of any further segments of the watermarked material 150, absent the appropriate permission to access this watermarked material. This CD player or recorder does not require that each and every segment of the watermarked material be watermarked with a WM 1 watermark to preclude access to protected material, and thus the other segments can be encoded with different watermarks.

Obviously, the likelihood of detection of a particular watermark will be dependent upon the likelihood that the particular watermark was selected by the encoding process to encode the segment that the detection device is processing. In a preferred embodiment of this invention, the expected distribution of watermark detector-types is used to bias the random process that is used to select the encoded watermark processes. That is, if two or three watermarking processes become prominent, such that a large proportion of media players contain at least one of these watermark detectors, the random process of the preferred encoder ensures that a substantial portion of the content material is encoded using these popular watermarking processes.

It is significant to note that the multiple-watermark process of this invention alleviates the need to arrive at a "standard" watermarking process throughout the recording industry, and protects the industry from an eventual 'cracking' of such a standard watermarking process. In accordance with this invention, multiple watermarking processes are preferred to a common standard, for the added security that is provided by the use of multiple watermarks in a watermarked product, such as a Compact Disk (including CD-R and CD-RW disks), a Digital Video Disk (including DVD audio disk), a Dataplay disk, a Superaudio CD, a flash memory, a memory stick, and an SD card.

As a further security measure, the manufacturers of the rendering devices may place different watermark detectors in different products, using for example, a random selection from among the different watermark detectors, thereby further frustrating attempts to overcome one particular watermark. In addition to reducing the inherent cost of the rendering device, compared to one with multiple detectors, this approach also reduces the cost of the rendering device by reducing the number of royalty payments paid to providers of the watermark detection systems for each product.

Figure 2:
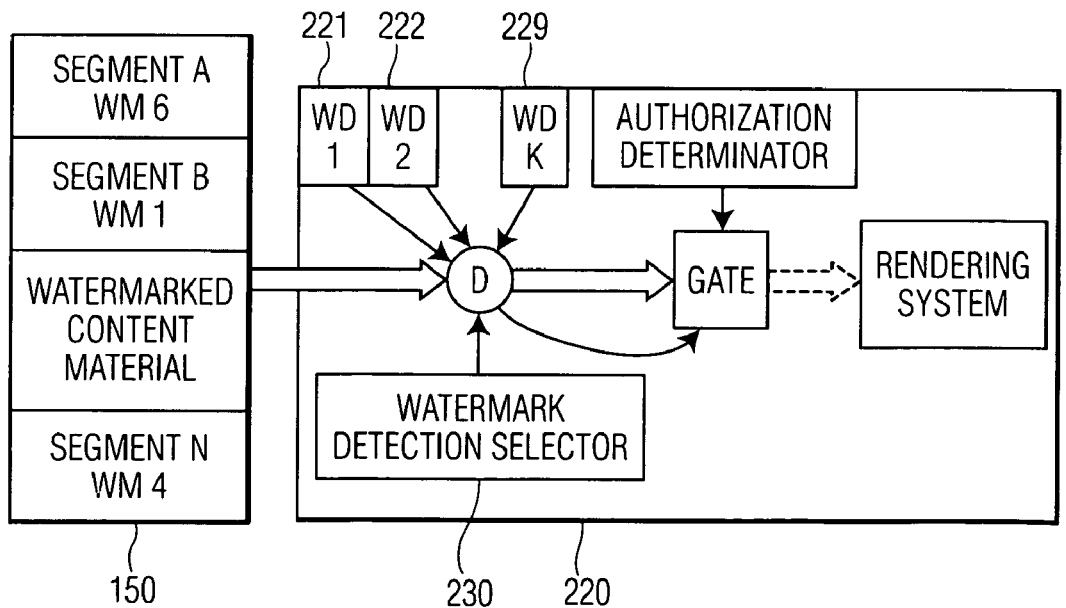
FIG. 2 illustrates an example block diagram of a watermark detection system in accordance with a second aspect of this invention.

FIG. 2 illustrates a further aspect of this invention, wherein a rendering device 220 is configured to contain a plurality of watermark detectors 221-229. Generally, because the rendering device 220 is a consumer product, cost considerations will likely allow far fewer watermark detectors 221-229 in the rendering device 220 than watermark encoders 121-129 in the encoding device 120 of FIG. 1. However, merely providing two different detectors 221-229 in the rendering device 220 substantially enhances the security provided by the multiple watermarked content material 150, because it would require that a watermark removal corresponding to each of these watermarks be applied to the illicitly copied material. Depending upon the resources required to perform each type of detection, the multiple detectors 221-229 may be configured to operate in parallel, or one detector may be selected at random, via a detection selector 230, for analyzing the content material, or parts of the content material.

Note that, in an alternative embodiment, the multiple detectors 221-229 need not reside in the rendering device 220. If the detectors 221-229 share a common underlying technology, the particular detector may be a software process that is downloadable from a detector source, such as an Internet site. In such an embodiment, each time the rendering device 220 is provided access to the Internet, it randomly selects a compatible watermark detection scheme 221-229 to download.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A watermark encoding system comprising:
    a plurality of watermark systems, each watermark system being configured to provide a different type of watermark, and a watermarking selector that is configured to receive content material and to provide therefrom watermarked content material comprising at least two different types of watermarks, wherein, the watermarking selector is configured to identify a first segment of the content material and apply a first type of watermark in accordance with a first watermark system, and to identify a second segment of the content material and apply a second type of watermark in accordance with a second watermark system, wherein the first and second watermark systems are selected from the plurality of watermarked systems, wherein the watermarking selector is biased in favor of selecting one or more select watermark systems, and wherein a preferred encoder is biased by a random process to ensure that a substantial portion of the content material is encoded using desired watermarking processes so that a number of watermark detectors is reduced in a rendering device and the number is less than a total number of different watermark encoders in an encoding device that provides different watermark types in accordance with the plurality of watermark systems.

2. The watermark encoding system of claim 1, wherein the content material has at least one type of data.

3. The watermark encoding system of claim 1, wherein the watermarking selector is biased in favor of selecting the one or more select watermark systems based on expected distribution of watermark detectors associated with the one or more select watermark systems.

4. The watermark encoding system of claim 1, wherein a size of the first segment is determined based on at least one of: a random process, and the first watermark system.

5. A method of manufacturing rendering devices, the method including the acts of:
    providing a plurality of different watermark detectors,
    providing a plurality of rendering devices, and
    selectively placing one or more of the plurality of different watermark detectors in each of the plurality of rendering devices, wherein the selectively placing the one or more of the plurality of different watermark detectors in each of the plurality of rendering devices is biased in favor of selecting one or more select watermark detectors, and wherein a preferred encoder is biased by a random process to ensure that a substantial portion of the content material is encoded using desired watermarking processes so that a number of watermark detectors is reduced in a rendering device and the number is less than a total number of different watermark encoders in an encoding device that provides different watermark types in accordance with a plurality of watermark systems.

6. The method of claim 5, wherein the selectively placing the one or more of the plurality of different watermark detectors in each of the plurality of rendering devices is performed when the rendering devices are provided access to the Internet.

7. The method of claim 5, wherein the rendering device is configured to render watermarked content material that is contained in one or more of the following media: a Compact Disk, a Digital Video Disk, a Dataplay disk, a Superaudio CD, a flash memory, a memory stick, and a SD card.

8. A computer readable storage medium for communicating watermarked content material, comprising a segment of the watermarked content material that is encoded with a first type of watermark encoded with a first watermark process in accordance with a first watermark system, and at least one other segment of the watermarked content material that is encoded with a second type of watermark encoded with a second watermark process in accordance with a second watermark system different from the first watermark system, the second type of watermark being different from the first type of watermark, wherein one of the first and second types of watermarks is included based on a biased selection between the first and second types of watermarks, and wherein a preferred encoder is biased by a random process to ensure that a substantial portion of the watermarked content material is encoded using desired watermarking processes so that a number of watermark detectors is reduced in a rendering device and the number is less than a total number of different watermark encoders in an encoding device that provides different watermark types in accordance with a plurality of watermark systems.

9. The computer readable storage medium of claim 8, wherein the watermarked content material has at least one type of data.

10. The computer readable storage medium of claim 8, comprising at least one of: a Compact Disk, a Digital Video Disk, a Dataplay disk, a Superaudio CD, a flash memory, a memory stick, and a SD card.

11. The computer readable storage medium of claim 8, comprising a computer file.

12. A method of watermarking content material, comprising the acts of:
    identifying a first segment of the content material,
    encoding the first segment via a first watermarking process in accordance with a first watermarking system, to form a first watermarked segment,
    identifying a second segment of the content material,
    encoding the second segment via a second watermarking process in accordance with a second watermarking system that differs from the first watermarking process system, to form a second watermarked segment,
    combining at least the first watermark segment and the second watermarked segment to form multiple-watermarked content material, and
    selecting the first watermarking process from a plurality of watermarking processes, wherein the selecting act is biased in favor of selecting one or more select watermark systems, and wherein a preferred encoder is biased by a random process to ensure that a substantial portion of the content material is encoded using desired watermarking processes so that a number of watermark detectors is reduced in a rendering device and the number is less than a total number of different watermark encoders in an encoding device that provides different watermark types in accordance with a plurality of watermark systems.

13. The method of claim 12, wherein the watermarking content material has at least one type of data.

14. The method of claim 12, wherein identifying the segment includes identifying a size of the segment.

15. The method of claim 14, wherein identifying the size of the segment is based on at least one of: a random process, and the first watermarking process.

16. A watermark detection device comprising; plurality of detectors including a first detector and a second detector, wherein the first detector is configured to detect a first type of watermarking in a watermarked content based on a first watermarking system, and the second detector is configured to detect at least one other type of watermarking in the watermarked content based on another watermarking system different from said first watermarking system, and a detection selector that is configured to select one of the first detector and the at least one other detector for detecting a watermark associated with watermarked content material, wherein the selecting act is biased in favor of selecting one or more select watermark systems and wherein a preferred encoder is biased by a random process to ensure that a substantial portion of the content material is encoded using desired watermarking processes so that a number of watermark detectors is reduced in a rendering device and the number is less than a total number of different watermark encoders in an encoding device that provides different watermark types in accordance with a plurality of watermark systems.

17. The watermark detection device of claim 16, wherein the detection selector is configured to select one of the first detector and the at least one other detector when the watermark detection device is provided access to the Internet.

18. The watermark detection device of claim 16, wherein the detection selector is configured to select one of the first detector and the at least one other detector via a random process.

19. A method of manufacturing a product that is configured to control rendering of watermarked content material comprising the acts of:
    selecting a watermark detector from a plurality of watermark detectors, wherein each watermark detector of the plurality of watermark detectors is associated with a different watermark system, the selecting act being biased in favor of selecting one or more select watermark detectors; and
    configuring the selected watermark detector to control the rendering of the watermarked content material, based on a detection of a watermark in the watermarked content material by the selected watermark detector, wherein a preferred encoder is biased by a random process to ensure that a substantial portion of the content material is encoded using desired watermarking processes so that a number of watermark detectors is reduced in a rendering device and the number is less than a total number of different watermark encoders in an encoding device that provides different watermark types in accordance with a plurality of watermark systems.

20. The method of claim 19, wherein the product includes at least one of: a CD player, a DVD player, a memory device player, and a Dataplay player.

\* \* \* \* \*